United States Patent [19]

O'Brien

[11] 3,963,176
[45] June 15, 1976

[54] COMBINED ARTICLE SELECTOR AND CODER
[75] Inventor: Richard C. O'Brien, Dayton, Ohio
[73] Assignee: O.K. Partnership, Cincinnati, Ohio
[22] Filed: July 17, 1975
[21] Appl. No.: 596,915

[52] U.S. Cl. .................................. 234/48; 234/94
[51] Int. Cl.² ........................................ G06K 1/08
[58] Field of Search .................. 234/40, 46, 47, 48, 234/116, 115, 94

[56] References Cited
UNITED STATES PATENTS
3,622,067  11/1971  Bucy .................................... 234/48
3,625,416  12/1971  Cross, Jr. ............................. 234/48

Primary Examiner—J. M. Meister
Attorney, Agent, or Firm—Wood, Herron & Evans

[57] ABSTRACT

A combined selector-coder apparatus is disclosed for selecting one or more edge-notched cards from a stack and for edge coding cards by removing selected teeth. The coding apparatus of this invention comprises an integral part of the card selector and includes knife blades actuated by the code bars used to select cards. When a code bar is displaced, it shifts its associated knife blade which in turn cuts a tooth from an edge-notched card disposed in an adjacent card holder.

14 Claims, 8 Drawing Figures

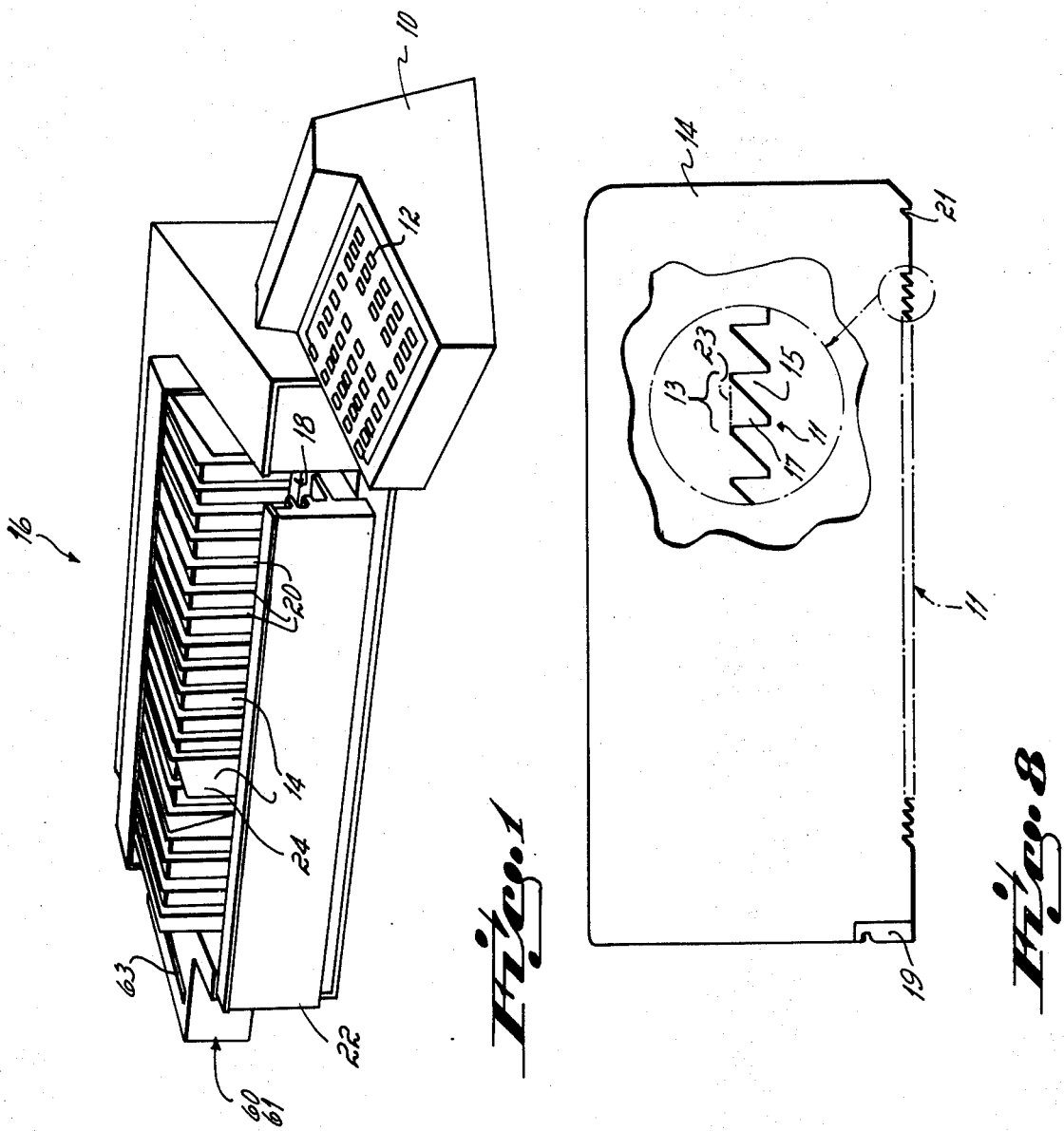

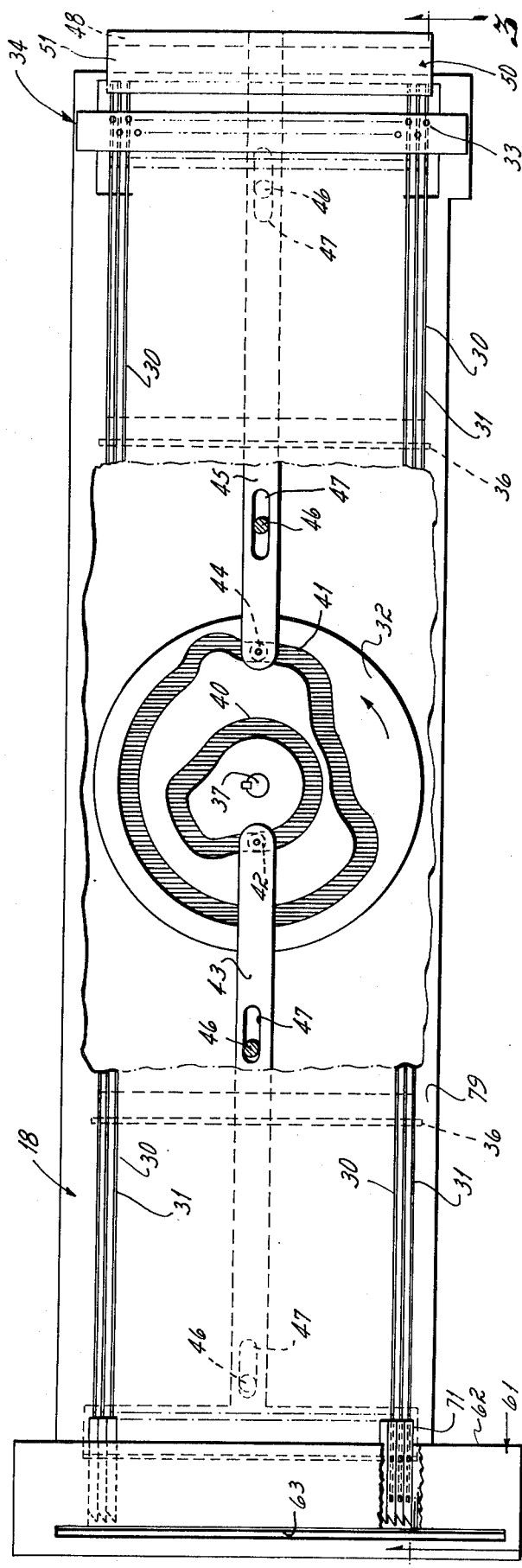
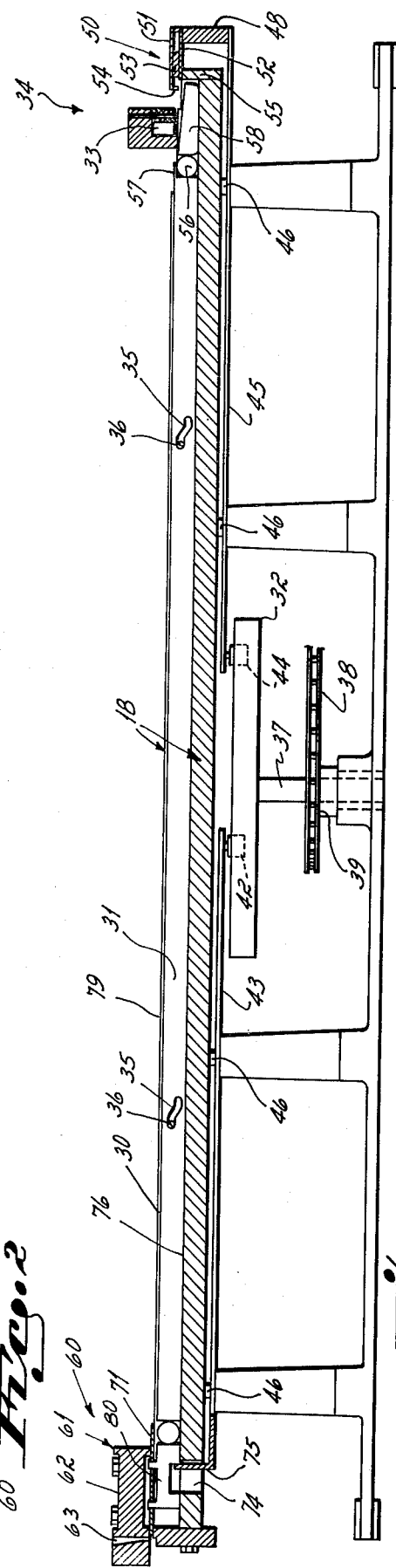

COMBINED ARTICLE SELECTOR AND CODER

BACKGROUND OF THE INVENTION

This invention relates generally to systems for selecting randomly stored articles, such as cards, envelopes, film jackets, and the like, having edge coding notches along at least one margin thereof. The present invention is more particulary directed to a combined selector for selecting coded articles and a coder for cutting or punching selected teeth to edge code articles of the type stored within the system.

In the past, many systems have been proposed for selecting one article from a plurality of edge-notched articles stored within the system. One such system is described in Parry et al. U.S. Pat. No. 3,478,877. The selector described in that patent includes a slotted platen for supporting from below a plurality of edge-notched cards, or the like, with coding notches disposed longitudinally along the lower edge of said card. Each of the cards used in the system has a plurality of teeth. Some of these teeth are removed from each card to code the card with information. The card selector is provided with a mechanism for selectively raising coding bars from within the platen slots to engage registration notches in each of the cards. The coding bars which are raised correspond to the removed tooth pattern of the desired card or cards.

Once all of the selected coding bars have been raised, the selection mechanism is operative to slide the selected card or cards transversely across the platen. Only those cards bearing the desired code are not restrained by the code bars. These cards are thus initially separated from the remainder of the cards. Thereafter, as explained in Parry et al. U.S. Pat. No. 3,478,877, the "rejected" cards are locked in position and the selected card or cards are completely separated from the stack.

The article selection system in the above-identified Parry et al patent includes only a selector. These is no provision in the apparatus for coding a card, or the like, to permit a new card to be added to the group of cards stored in the system. In practice, cards have been coded on a separate card punching apparatus, such as the document coder described in the patent granted to Thomas R. Bucy, U.S. Pat. No. 3,622,067. Thus, a separate piece of equipment was necessary to allow the user to add new cards to the system or to replace a damaged card. This requirement adds considerably to the cost of system installation and, in addition, requires appreciable additional space.

One proposed solution to this problem is disclosed in Cross U.S. Pat. No. 3,625,416. While that patent does show a combined selector and coder, the structure proposed still has several defects. In the first place, the coder is not automatic in operation, but rather requires the manual depression of a handle to provide the card punching force. Moreover, the construction shown in objectionable for other reasons, e.g., it requires the addition of a substantial number of components to the selector. These require an appreciable amount of space and materially add to the cost of the overall unit.

In view of the foregoing limitations of the prior art, it is the primary object of this invention to provide a combined edge-notched article selector and coder which is automatic in operation.

It is a further objective of this invention to provide a combined article selector and coder which is highly reliable and less expensive than prior art devices.

It is a further object of the invention to provide a combined article selector and coder of compact size.

It is another object of the invention to provide a combined article selector and coder in which an article selection operation can be performed simultaneously with an article coding operation, the article coding operation requiring that no additional controls be manipulated by the operator.

It is yet another object of the present invention to provide a coder which requires a minimal amount of force to operate so that the coder can be actuated by the force normally provided to shift the code bars of the selector.

More particularly, the present invention is predicated on the concept of providing a card punching unit which utilizes the movement of selector bars in a card selector to effect also the punching operation on a card to be coded. A combined selector and coder of the present invention advantageously utilizes selector bars of the type shown in Parry et al U.S. Pat. No. 3,478,877. These selector bars have a two-component movement. The bars are raised by shifting them in a horizontal direction and camming them upwardly.

In accordance with the present invention, the horizontal component of the bar movement is utilized to shift the cutting blades associated with those bars shifted for shearing the corresponding teeth of a card to be coded.

A still further advantage of the present invention is that the coding operation is accomplished by the same keyboard operation used to select a card. That is, the user merely enters the desired code to be encoded in the card on the keyboard and inserts a blank card in the coder. The card is then coded automatically.

These and other objects and advantages of this invention will become more readily apparent from a consideration of the following detailed description of a preferred embodiment of the invention:

DESCRIPTION OF THE DRAWINGS

FIG. 1 is a perspective of a combined article selector and coder embodying the present invention.

FIG. 2 is a top plan view, partially broken away, of the coder unit and the card supporting platen of the selector.

FIG. 3 is a vertical cross-sectional view taken along line 3—3 of FIG. 2.

FIG. 8 is an elevational view of one form of card for use in the apparatus of the present invention.

DETAILED DESCRIPTION

Figure 4:
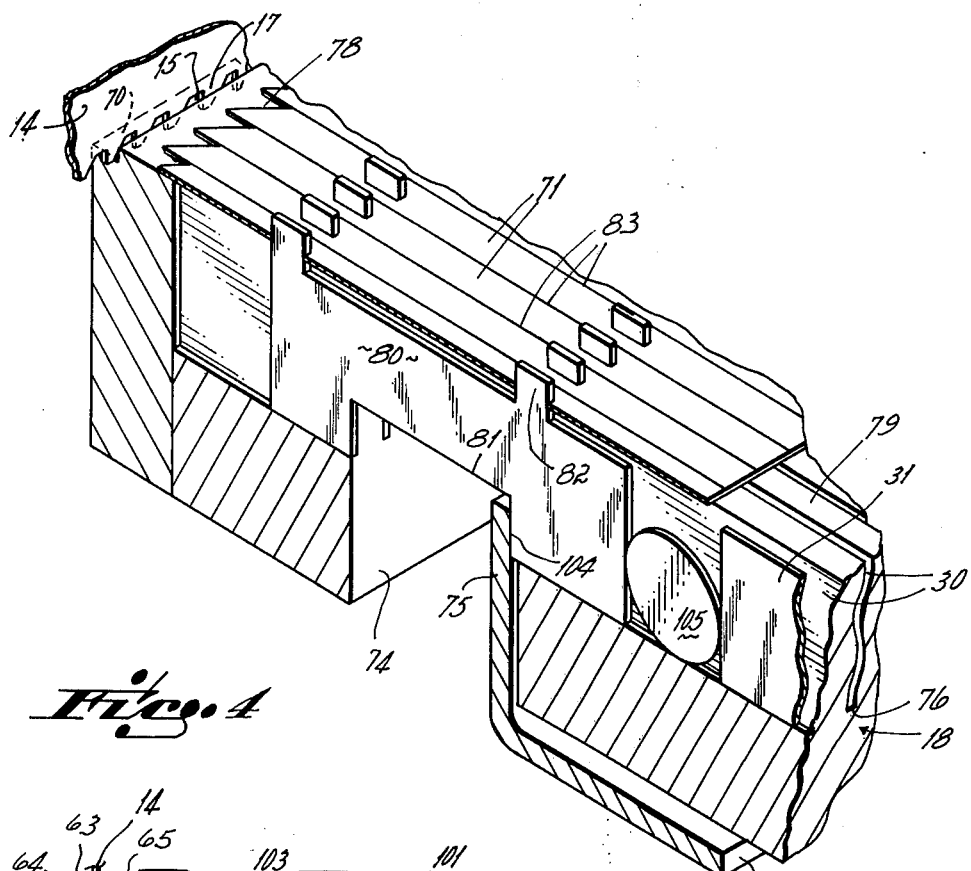
FIG. 4 is a perspective view, partially broken away, of the coder of the present invention.

As shown in FIG. 1, an article selection system embodying the present invention includes a keyboard control console 10 which is utilized by the system operator to enter, via console keys 12, a code which corresponds to the identity of an edge-notched card being sought from the plurality of such cards stored in the system. The keys 12 are operated in the same manner to establish a code which is to be encoded on a card by cutting selected teeth therefrom.

A plurality of cards 14 are positioned in the card selector mechanism shown generally at 16. As best shown in FIG. 8, each such card 14 is formed from a card stock substantially like that used for data processing cards. Card 14 is generally rectangular and includes at least one coded or sorting edge 11.

The sorting edge includes a plurality of code sites 13. Each code site includes a registration notch 15 and a selectively removable or notchable tooth 17. The cards also include a ferromagnetic chip 19, and a locking notch 21 used in the selection operation as described in the above-referred to Parry et al. patent. These latter elements are not utilized in coding a card and constitute no part of the present invention. Cards 14 are coded by removing one or more teeth 17 in accordance with a predetermined coding scheme. In accordance with the present invention, a tooth is removed by cutting it along the line 23 as is explained in detail below.

When cards 14 are disposed in the selector 16, they are oriented so that their sorting edges 11 are disposed lowermost so as to rest on the upper surface of a platen 18. A plurality of spaced, vertically extending card dividers 20 are located above the platen 18 for maintaining the cards 14 in a vertical position with their notched edges resting on the platen 18. The card selecting mechanism 16 includes a carrier 22 which is horizontally movable and operates in cooperation with other components of the selection mechanism to remove a selected card, or cards, such as card 24, from the stack of cards which are resting on the platen 18.

For a complete detailed description of the operation of an article selector, the reader is directed to Parry et al. U.S. Pat. No. 3,478,877, and the description contained in that patent is incorporated herein by reference. The present application will describe in detail only those portions of the selector which cooperate with the coder mechanism.

The overall relationship of the card selector and the coder is best shown in FIGS. 2 and 3. As there shown, the card-supporting platen 18 is a flat plate of generally rectangular configuration. The platen is provided with a plurality of parallel slots 30 disposed in a direction transverse to the sorting edges 11 of the cards 14. The slots 30 correspond in number and position to the registration notches 15 on the cards, there being one additional slot corresponding to locking notch 21 on the cards. When the cards 14 are properly positioned on the platen 18 for sorting, the slots 30 are disposed beneath the corresponding registration notches 15 and the locking notch 21.

A code bar, or sorting bar, 31 is slidably disposed in each of the slots 30 opposite a registration notch 15 of a stored card 14. A similarly configurated locking bar (not shown) is disposed in the slot located opposite locking notch 21.

The code bars are adapted to be positioned in either one or two vertical positions, i.e., an upper position and a lower position. In the upper position the code bars extend above the upper surface of the platen by an amount equal to, or slightly less than, the depth of the registration notches 15. In the lower position, the upper edges of the code bars are preferably flush with, or slightly below, the upper surface of the card support platen. The code bars are shifted between their upper and lower positions by a two-component movement, i.e., the bars are shifted in a horizontal direction (to the left in FIG. 3) and are then cammed upwardly into their raised position. The bars are lowered by shifting movement in the opposite horizontal direction (to the right in FIG. 3) which results in the bars being cammed downwardly. The camming movements are due to the engagement of the arcuate slots 35 in bars 31 with stationary pins 36 which extend transversely of the bars.

Control over the specific code bars to be elevated during a particular operation is effected from the keys 12 of console 10. These keys control the solenoids 33 forming part of an interposer mechanism indicated generally at 34. It is to be understood that the specific form of interposer mechanism constitutes no part of the present invention and that the interposer mechanism can either take the form of a mechanism hereinafter described or, alternatively, another form, such as that shown in Parry U.S. Pat. No. 4,478,877.

As shown in FIGS. 2 and 3, the mechanism for actuating the sorting bars 31 through interposer 34 includes a drive plate 32 mounted beneath platen 18. The drive plate is mounted upon a vertical shaft 37 which is interconnected through a suitable means, such as chain 38 and sprocket 39, to a motor (not shown) controlled from console 10. Shaft 37 is effective to rotate plate 32 one complete revolution in counterclockwise direction during each operating cycle of the device.

The upper surface of drive plate 36 is provided with two cam slots 40 and 41. Slot 40 has located therein a follower roller 42 mounted upon a reset arm 43, while slot 41 receives roller 44 mounted upon an actuator arm 45. Arms 43 and 45 are constrained to reciprocating linear movement by means of pins 46 received within elongated guide slots 47 formed in each of the arms.

Actuator arm 45 carries at its outer end a bar 48 which extends from front to rear parallel to the outer edge of the platen. This bar supports a magnetic platen assembly 50. The platen assembly includes parallel spaced, magnetically susceptible plates 51 and 52 having mounted therebetween a permanent magnet 53. The upper plate extends outwardly beyond the magnet 53 and lower plate 52 includes a downwardly extending arm 54 constituting a rest pole. The edge of lower plate 52 constitutes a pusher pole. This magnetic platen is adapted to be shifted between a retracted and advanced position (i.e., from right to left in FIGS. 2 and 3) by movement of actuator arm 45. As the magnetic platen is advanced, plate 52 passes above a stationary stop plate 55 mounted on the edge of platen 18 and enclosing the ends of each of the slots 30.

It is to be understood that each of the slots 30, code bars 31 and the disc and blade components of the interposer mechanism described below associated with each slot are identical with those shown in FIG. 3. More particularly, the interposer end of each slot receives a disc 56 which is free to roll in the slot and is in engagement with the end of code bar 31. The disc 56 is restrained within the slot by an overhanging lip 57 formed on the end of the actuator bar. An interposer blade 58 is disposed within the slot on the side of disc 56 remote from the code bar. The interposer blade is of generally trapezoidal configuration with its upper wall sloping downwardly so that the narrowest portion of the blade is outermost.

A solenoid 33 is mounted above each of the slots 30. The solenoids are positioned so that when the interposer blade 58 is in its retracted position as shown in FIG. 3, and the solenoid is energized, the blade is caused to pivot in a counterclockwise direction upwardly into contact with the rest pole 51. When an interposer blade is brought into contact with the rest pole, it is retained in this position by the permanent magnet even after the solenoid 33 is deenergized. The individual interposer solenoids are energized through an electrical circuit control by the code selection keys 14. Thus, when a code is entered on these keys, the solenoids associated with the corresponding code bars are momentarily energized to raise, or set, the adjacent interposer blades.

Thereafter, when the interposer blades corresponding to the desired codes have been "set," drive plate 32 is rotated to cause actuator bar 45 and the pusher assembly to be shifted to their advanced position, i.e., to the left in FIG. 3. When this movement occurs, those interposer blades which have been set, or raised, are shifted to the left. These set blades push discs 56 to the left and thereby cause code bars 31 to be shifted to the left and to be cammed upwardly so that their edges project above the platen.

It will be appreciated that the interposer blades 58 associated with the code bars which are not to be actuated remain in their lowermost position and are not engaged by the pusher assembly since blades 52 and 53 pass over the top of these interposer blades. As indicated above, this particular form of interposer mechanism does not constitute part of the present invention and a different form of interposer mechanism, for example, that shown in the above-identified Parry et al. patent, may be substituted.

Figure 5:
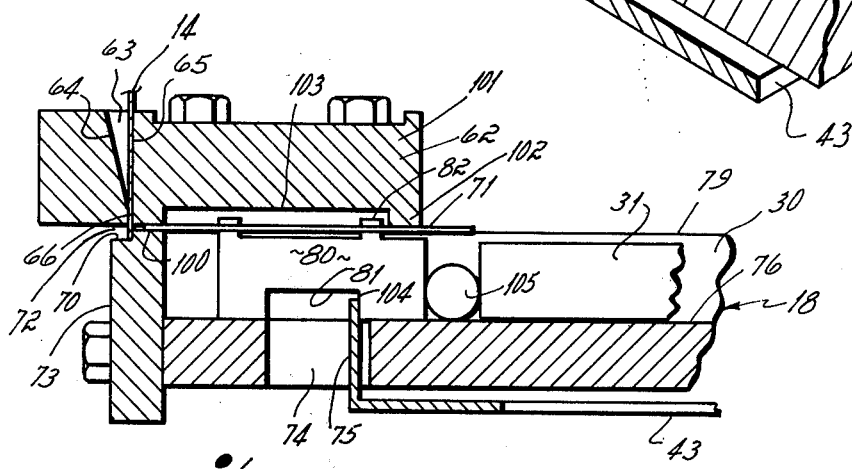
FIG. 5 is a vertical cross-sectional view showing the coder with the knife blades in a retracted position.

The coder apparatus 60 is disposed on the opposite side of the platen 18 from the interposer mechanism 34, i.e., at the left end of platen 18 as viewed in FIGS. 2 and 3. The coder mechanism comprises a housing 61 (FIG. 1) and includes a substantially rectangular upper member 62 which is bolted or otherwise secured to the platen. Member 62 has a vertical slot 63 for receiving an edge-notched card which is to be coded. As best shown in FIG. 5, the vertical slot 63 includes converging walls 64 and 65 which guide a card as it is inserted toothed-edge downwardly towards the narrow opening at the lower end of the slot shown generally at 66. This narrow opening 66 is only slightly wider than the thickness of a typical edge-notched card 14.

Disposed directly below the lower end of the slot is a ledge, or stop, 70 which supports from below any card 14 which is located in the slot 63. The ledge is operative to position the card 14 in precise vertical alignment with the cutting blades 71 to permit removal of teeth from the card along line 23 at the top of the teeth (FIG. 8). An opening 72 disposed above the ledge 70 and extending transversely across the vertical end plate portion 73 of the housing 61 is provided so that teeth which are removed can be ejected from the punching mechanism to prevent clogging.

As shown in FIGS. 3–7, a slot 74 is cut through the platen 18 in an area beneath housing member 62 for receiving an upstanding vertical flange 75 formed on the end of reset arm 43. Upstanding flange 75 extends transversely across the platen 18 and extends upwardly beyond the bottom wall 76 of each longitudinal slot 30. This flange on reset arm 43, as will become more clear later, is reciprocated upon rotation of drive plate 32 and is effective to return all of the previously actuated knife blades 71 and code bars 31 from their advanced (leftmost in FIG. 3) to their retracted position (rightmost in FIG. 3).

Certain details of the coding mechanism are shown in greater detail in FIGS. 4–7. As there shown, a plurality of flat knife blades 71, of generally rectangular configuration, are mounted for horizontal movement toward and away from slot 63. The outermost end of each knife blade 71 has a cutting edge 78 which is angled with respect to the longitudinal axis of the blade so that the blade progressively cuts through a tooth 17 of card 14. Each cutting blade 71 is substantially wider than a slot 30 and is disposed above one such slot in sliding engagement with the upper surface 79 of the platen 18.

A knife blade actuator plate 80 is disposed in each platen slot 30. Each actuator plate is relatively thin, i.e., of a width slightly less than the width of a slot 30. Each actuator plate is of generally rectangular configuration and includes a rectangularly shaped notch 81 disposed along its bottom edge for receiving the upstanding flange 75 of arm 43. Extending upwardly from the upper surface of each actuator plate are two spaced tabs 82 which are received within mating apertures in a knife blade 66.

Figures 6, 7:
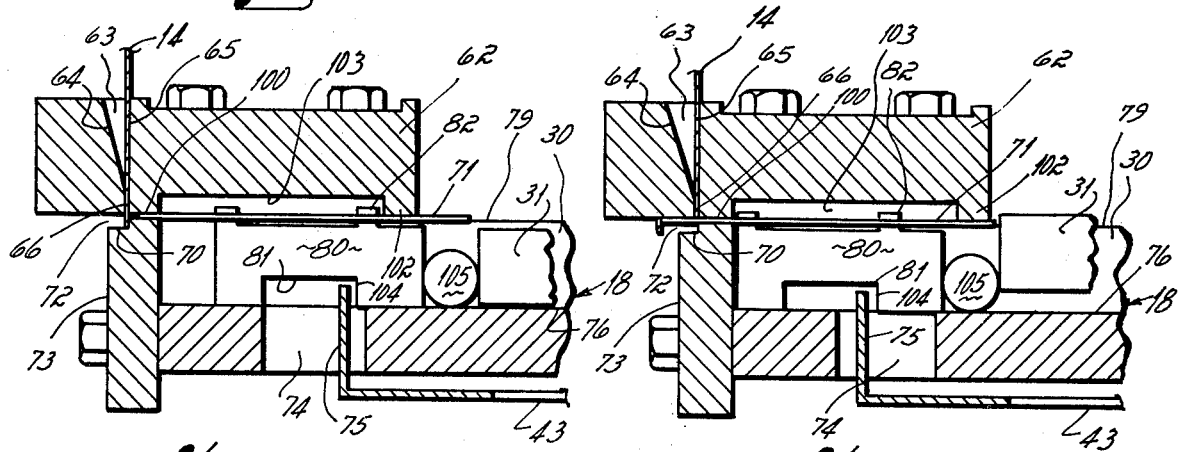
FIG. 6 is a vertical cross-sectional view similar to FIG. 5 with the knife blades and code bars still retracted, but with the reset bar partially advanced.
FIG. 7 is a vertical sectional view taken through the coder mechanism showing a selectively actuated knife blade after it has severed a tooth on an edge-notched card.

As shown in FIG. 4, each actuator plate 80 has an associated knife blade 71 disposed directly thereabove which is engaged by the two tabs 82 extending upwardly therefrom. Thus, when any actuator 80 is shifted along its slot, it will be operative to slide the correspondingly engaged knife blade 71 in a horizontal direction along the upper surface 79 of the platen 18. In its retracted position, blade 71 is withdrawn from engagement with a card in slot 63. However, when it is advanced, blade 71 cuts through the card as shown in FIG. 7.

To prevent vertical movement of the cutting blades 71, the leftmost end of each blade is located in a blade slot 100 formed in the card support housing 61. This blade slot 100 is disposed transversely of the platen slots 30 and is of a size just large enough to admit all the cutting blades 71. The housing 61 also includes a lip 101 in overlying relation to each cutting blade 66 forming a shoulder 102 which is in sliding engagement with the upper surface of each of the cutting blades. A recess 103 is formed in member 62 between shoulder 102 and slot 100 to receive the tabs 82 of each blade actuator 80.

In operation, a user wishing to code a card inserts a toothed card of the type shown in FIG. 8 with the toothed coding edge extending downwardly into slot 63. The card is inserted until it comes to rest upon ledge 70. The slot 63 includes means engaging the side edges of the card for positioning the card with its teeth 17 in alignment with the proper corresponding slots 30 and knife blades 71. At the commencement of operation, the knife blades 71 are in their retracted positions as shown in FIGS. 3 and 5. The code setting bars 31 are also in their retracted position as shown in FIG. 3.

In order to code the card, the operator enters the desired code by punching the keys 12 of the console. These keys are effective through control circuits of the type well known in the art to energize those solenoids 33 associated with the code bars 31 corresponding to the code entered on keys 12. As each solenoid 33 is energized, its associated actuator blade 58 is raised into engagement with rest pole 54 and is captured by the permanent magnetic force. Thereafter, the solenoids are deenergized, but those actuator blades which have been pivoted upwardly remain captured by the permanent magnet.

In the next step, the operator pushes a suitable button to commence the sorting and/or coding operation. In response to the depression of this button, a motor (not shown) is effective to rotate disc 32. As this disc rotates, reset bar 43 is shifted to the left as its roller 42 tracks in cam groove 40. Outward movement of the reset arm (to the left in FIGS. 3 and 5–7) disengages the flange 75 of reset arm 43 from shoulder 104 of the actuator plate 80, thereby freeing these members for an advancing movement (to the left in FIGS. 5–7).

At the same time, roller 44 associated with arm 45 tracks in groove 41 causing the interposer assembly to be shifted to the left. As it moves to the left, pusher pole 52 forces the raised interposer blades to the left along their grooves 30. These blades in turn force their associated discs 56 and blades 31 toward their advanced position, i.e., to the left in FIG. 3. As blades 31 move to the left, they are cammed upwardly by the interengagement of pins 36 and cam slots 35. These blades thus rise above the platen and enter the registry notches in cards 14 disposed above the blades.

At the same time, the ends of the coder bars 31 shift discs 105 to the left. The force exerted upon these discs is transmitted to actuator plates 80 which are similarly displaced to the left as shown in FIG. 7. As the actuator plates move toward the left, their upstanding tangs 82 force the overlying associated knife blades to the left, bringing these knife blades into engagement with the aligned teeth of the card located within slot 63. Each knife blade 71 which is so advanced progressively cuts the adjacent tooth of the card to code the card with the code established on keys 12. As a result, the card placed in slot 63 is automatically encoded without any additional intervention by the operator.

After the bars 31 have been set, the selector cycle is completed to remove the desired card or cards from the stack of cards 14. This occurs simultaneously with a coding operation. As the sorting-coding cycle progresses, disc 32 continues to rotate toward its original home position. As it rotates toward that position, actuator arm 45 is shifted toward its retracted position, i.e., to the right in FIG. 3. This frees interposer blades 58, discs 56 and blades 31 for retracting movement to the right.

This continued rotary movement of drive disc 32 also causes reset arm 43 to be shifted toward its retracted position, i.e., to the right in FIG. 3. As the arm moves in this manner, its upstanding flange 75 engages shoulders 104 of the previously advanced actuator plates 80, forcing those plates toward their retracted position (to the right). As these plates are shifted, they carry their associated blades 71 toward their retracted position (to the right). Additionally, the actuator plates force discs 105 to the right and these discs in turn act upon their associated code bars. As the code bars 31 are shifted to the right, they are also cammed downwardly by the interaction of pins 36 and slots 35.

Additionally, the opposite ends of code bars 31 force associated discs 56 and interposer blades 58 to the right. Movement of the interposer blades in this direction is stopped by stop 55. However, the magnetic armature assembly including poles 52 and 54 is shifted even further to the right so that they are disengaged from the actuator interposer blades, permitting the interposer blades to drop to the position shown in FIG. 3. Thereafter, the magnetic platen is again advanced slightly to the left by inward movement of arm 45 to its initial position shown in FIG. 3.

At the conclusion of the cycle, the motor rotating discs 32 is deenergized, leaving the entire unit in condition for the next cycle as shown in FIG. 3.

From a consideration of the preceding disclosure of the objects and advantages of the present invention and the detailed description of one preferred embodiment, those skilled in the art will readily comprehend various modifications to which the present invention is susceptible. Therefore, I desire to be limited solely by the scope of the following claims.

Having described my invention, I claim:

1. A combined selector for selecting articles having a sorting edge with alternate registration notches and code notchable teeth from a plurality of such articles supported with their respective sorting edges aligned and a coder for selectively notching the teeth of such articles to encode the articles comprising:

a platen for supporting said articles;

a plurality of spaced parallel slots within said platen extending transversely of said sorting edges adjacent said registration notches;

a plurality of sorting bars, one of said sorting bars being disposed within each of said slots;

means for selectively displacing said sorting bars in accordance with a preselected code, whereby said displaced bars are raised above said platen and enter registration notches in said articles, and articles not having said selected code are restrained, while articles having the selected code can be shifted relative thereto;

a card-receiving slot for receiving a toothed article to be encoded;

stop means limiting the insertion of said article within said slot;

a knife blade associated with each of said sorting bars, each of said knife blades being movable transversely of said slot and being positioned to sever one tooth from said article;

means responsive to the displacement of a sorting bar for shifting an associated blade transversely of said slot to sever the tooth in registry therewith; and means for returning said blades to a retracted position.

2. The apparatus of claim 1 in which said sorting bars are displaced with a vertical component and a horizontal component; and said means for shifting said knife blades is responsive only to the horizontal component of displacement.

3. The apparatus of claim 1 in which said means for returning said blades is also effective to return said sorting bars to a retracted position.

4. The apparatus of claim 1 in which said means for displacing said coding bars includes an interposer disposed adjacent to one side of said platen and said article-receiving slot is disposed adjacent to the opposite side of said platen.

5. The apparatus of claim 3 in which said means for displacing said coding bars comprises a reciprocally moving actuating bar and said means for returning said blades includes a reciprocally moving reset bar, said actuating bar and said reset bar being movable in a direction parallel to said sorting bars; and a drive means for shifting said bars.

6. The apparatus of claim 5 in which said drive means includes a rotatable cam plate mounted beneath said platen, the cam plate having a track therein receiving a follower associated with said reset bar.

7. The apparatus of claim 2 in which said means for shifting said knife blades includes an actuator plate slidably disposed in each of said slots and being shifted outwardly along said slot in response to horizontal movement of the associated code bar, one knife blade overlying each of said actuator plates and being interconnected thereto.

8. The apparatus of claim 7 further including a disc disposed in each slot intermediate said code bar and said actuator plate.

9. The apparatus of claim 7 in which each of said actuator plates is provided with a slot and in which said means for returning said blades to a retracted position includes a reciprocating reset arm having a portion in engagement with said slot.

10. A coder for selectively notching the teeth of articles having a sorting edge with alternate registration notches and code notchable teeth, said coder being combined with a selector for selecting such articles from a plurality of such articles supported with their respective sorting edges aligned, said selector being of the type comprising a platen for supporting said articles and having a plurality of spaced parallel slots, a plurality of sorting bars, one of said sorting bars being disposed within each of said slots, and means for selectively displacing said sorting bars in a horizontal and vertical direction, said coder comprising:

a housing including a card-receiving slot for receiving a toothed article to be encoded;

stop means limiting the insertion of said article within said slot;

a knife blade associated with each of said sorting bars, each of said knife blades being movable transversely of said slot and being positioned to sever one tooth from said article;

means responsive to the displacement of a sorting bar for shifting an associated knife blade transversely of said slot to sever the tooth in registry therewith; and means for returning said knife blades to a retracted position.

11. The coder of claim 10 in which said knife blades are supported for horizontal movement in a plane above the platen and in which said means for shifting said knife blades includes an actuator plate slidably disposed in each of said slots and being shifted outwardly along said slot in response to horizontal movement of the associated code bar, one knife blade overlying each of said actuator plates and being interconnected thereto.

12. The coder of claim 11 further including a disc disposed in each slot intermediate said code bar and said actuator plate.

13. The coder of claim 11 in which each of said actuator plates is provided with a slot and in which said means for returning said blades to a retracted position includes a reciprocating reset arm having a portion in engagement with said slot.

14. The coder of claim 11 in which said actuator plate includes upstanding tangs which are received within openings in said knife blades.

* * * * *